(12) United States Patent
Jang et al.

(10) Patent No.: US 8,986,906 B2
(45) Date of Patent: Mar. 24, 2015

(54) METHOD FOR PREPARING NANOPOROUS PT/TIO$_2$ COMPOSITE PARTICLES

(75) Inventors: Hee Dong Jang, Daejeon (KR); Han Kwon Chang, Daejeon (KR); Kuk Cho, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 264 days.

(21) Appl. No.: 13/182,727

(22) Filed: Jul. 14, 2011

(65) Prior Publication Data

US 2012/0219882 A1     Aug. 30, 2012

(30) Foreign Application Priority Data

Feb. 25, 2011    (KR) ..................... 10-2011-0017032

(51) Int. Cl.
*H01M 4/88*          (2006.01)
*H01M 4/92*          (2006.01)

(52) U.S. Cl.
CPC ................ *H01M 4/926* (2013.01); *Y02E 60/50* (2013.01)
USPC ............... 429/524; 429/528; 429/532; 502/5; 502/300; 502/339; 502/350

(58) Field of Classification Search
CPC ...... H01M 4/9075; H01M 4/92; H01M 4/925
USPC .................. 429/523, 524, 528, 532
See application file for complete search history.

(56) References Cited

PUBLICATIONS

Alonso et al., Platinum nanoparticles supported on titania as an efficient hydrogen-transfer catalyst, Oct. 2008, Journal of Catalysis, 260, 113-118.*
Shanmugam et al., Synthesis and Electrochemical Oxygen Reduction of Platinum Nanoparticles Supported on Mesoporous TiO2, Oct. 2009, Journal of Physical Chemistry C, 113, 18707-18712.*
Jang et al., Co-Assembly of Nanoparticles in Evaporating Aerosol Droplets: Preparation of Nanoporous Pt/TiO2 Composite Particles, Oct. 27, 2010, Aerosol Science and Technology, 44, 1140-1145.*
Djinovic et al. Aerosol Synthesis of pure and Pt-doped ZnO particles using nitrate and pdda-Pt(IV) complex solutions, 2005, Journal of Materials Research, 20, 102-113.*
Jang et al., Synthesis of Pt/TiO2 nanocomposite via Aerosol Self Assembly and its Catalytic Application, May 5, 2010, American Association for Aerosol Research, abstract.*
Hampsey et al., One-Step Synthesis of Mesoporous Metal-SiO2 Particles by an Aerosol-Assisted Self-assembly Process, 2005, Chemistry of Materials, 17, 2475-2480.*

* cited by examiner

*Primary Examiner* — Sean P Cullen
(74) *Attorney, Agent, or Firm* — Renner Kenner Greive Bobak Taylor & Weber

(57) ABSTRACT

The present invention provides a method for preparing nanoporous Pt/TiO$_2$ composite particles, nanoporous Pt/TiO$_2$ composite particles prepared by the above preparation method, and a fuel cell comprising the nanoporous Pt/TiO$_2$ composite particles. The nanoporous Pt/TiO$_2$ composite particles according to the present invention have a catalytic effect similar to that of commercially available Pt/carbon black and, thus, can be applied to a fuel cell.

4 Claims, 9 Drawing Sheets

METHOD FOR PREPARING NANOPOROUS PT/TIO$_2$ COMPOSITE PARTICLES

CROSS-REFERENCE TO RELATED APPLICATION

This application claims priority to and the benefit of Korean Patent Application No. 10-2011-0017032, filed on Feb. 25, 2011, the disclosure of which is incorporated herein by reference in its entirety.

BACKGROUND

1. Field of the Invention

The present invention relates to a method for preparing nanoporous Pt/TiO$_2$ composite particles, nanoporous Pt/TiO$_2$ composite particles prepared by the above preparation method, and a fuel cell comprising the nanoporous Pt/TiO$_2$ composite particles.

2. Discussion of Related Art

Fuel cells are classified into various types according to the operating temperature and the type of main fuels. The performance of a polymer electrolyte membrane fuel cell (PEMFC) and a direct methanol fuel cell (DMFC), which operate at low temperature, particularly depends on the activity of an electrode catalyst.

Platinum has been used as an electrode catalyst since the polymer electrolyte membrane fuel cell and the direct methanol fuel cell were developed. The activity of platinum is high, but it is very expensive. Therefore, extensive research aimed at increasing the utilization of platinum by highly dispersing platinum on carbon has continued to progress.

A strategy to increase the utilization of platinum is to allow platinum nanoparticles to adhere to a high surface area, porous solid support. Since the open structure of the support promotes the diffusion and absorption of reactants, the support may have an advantage as an additional catalyst. Active carbon, carbon nanotubes (CNTs), carbon nanosheets, and silica gel have been used as supports for platinum nanoparticles for use as catalysts (Kim et al., 2006; Merlo et al., 2008; Li et al., 2009; Miyatake et al., 2009; Yoo et al., 2009; Hsu et al., 2010; Winjobi et al., 2010).

Titanium dioxide powder has been widely used as a white pigment and a cosmetic composition and further used as a reaction material of barium titanate (BaTiO$_3$), a dielectric material, and a photocatalyst. Titanium dioxide used in photocatalysis absorbs UV rays having a wavelength of 400 nm or less and excites electrons. When electrons and holes generated by excitation reach the surface of titanium dioxide particles, the electrons and holes react with oxygen or water to generate various radicals. These radicals exhibit the effect of oxidation, and thus the materials absorbed on the surface of the particles are oxidized and decomposed.

In general, the study of titanium nanoparticles is conducted to increase the surface area of nanoparticles with reduced and uniform particle size. Moreover, the study of preparing particles with a crystal phase of a desired fraction is conducted to improve the photocatalytic properties by controlling the crystal phase of the prepared particles.

Titanium dioxide nanoparticles are used as supports for improving the catalytic activity of platinum, but most of the studies relate to the synthesis of platinum/titanium dioxide complexes in which platinum is deposited on the surface of titanium dioxide.

SUMMARY OF THE INVENTION

Therefore, the inventors of the present invention have developed a method for preparing porous Pt/TiO$_2$ composite particles comprising mesopores and macropores by an aerosol process.

An object of the present invention is to provide a method for preparing nanoporous metal/ceramic composite particles. In more detail, the nanoporous metal/ceramic composite particles may be prepared by an aerosol-assisted co-assembly (AACA) process.

Another object of the present invention is to provide nanoporous metal/ceramic composite particles prepared by the above preparation method.

Still another object of the present invention is to provide a fuel cell comprising the composite particles.

In an aspect, the present invention provides a method for preparing nanoporous metal/ceramic composite particles, the method comprising:

(a) preparing a colloidal solution by mixing metal and ceramic nanoparticles in water;

(b) atomizing the colloidal solution into aerosol droplets; and (c) evaporating the aerosol droplets.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF THE INVENTION

Figure 1:
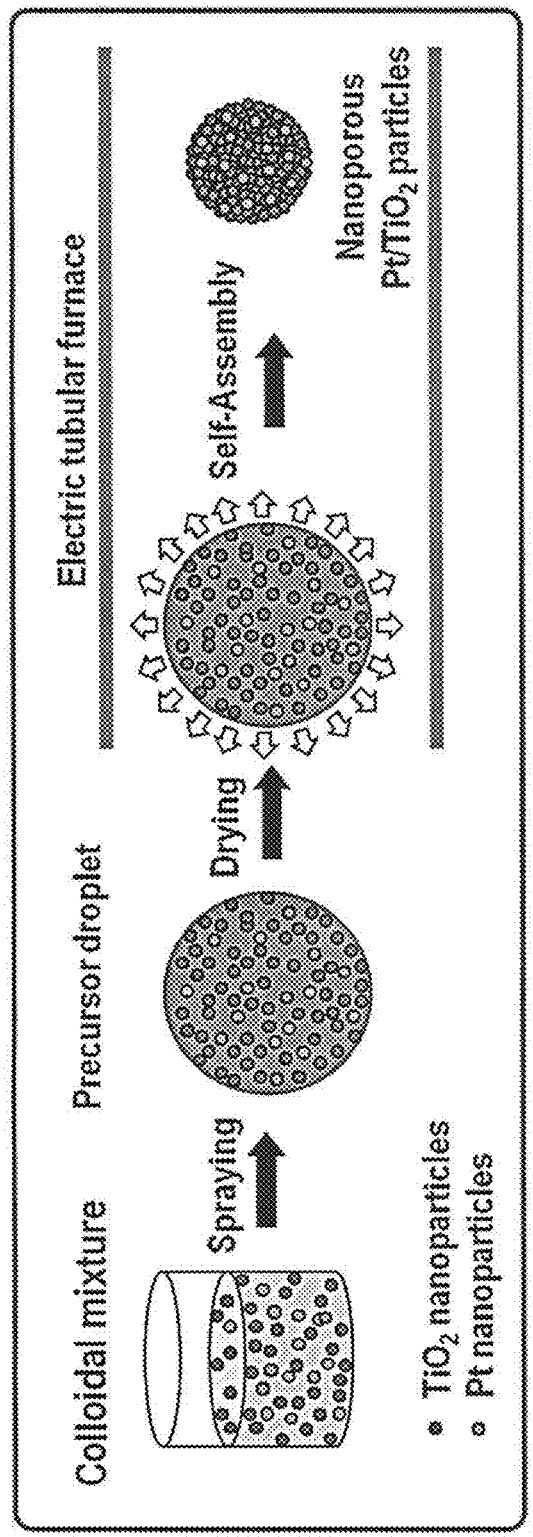
FIG. 1 shows an aerosol-assisted co-assembly (AACA) process for preparing Pt and TiO$_2$ nanoparticles.

The term "ceramic" used in the present invention refers to "ceramics" and is an inorganic, nonmetallic solid prepared by heating and cooling processes. The ceramics are manufactured using natural raw materials such as clay and the like and used as containers. Compared to this, fine ceramics are manufactured using high-purity artificial raw materials and used for various applications such as materials for electronic products, materials for precision instruments, etc. The ceramics do not conduct electricity well unlike metals and can withstand high temperature unlike organic materials.

Moreover, the nanoporous metal/ceramic composite particles according to the present invention may be prepared by an aerosol-assisted co-assembly (AACA) process. Preferably, the nanoporous metal/ceramic composite particles according to the present invention may be prepared by an aerosol-assisted co-assembly (AACA) process comprising: (i) obtaining a precursor solution by mixing metal and ceramic nanoparticles in water; (ii) atomizing the precursor solution into aerosol droplets using an ultrasonic atomizer; (iii) transferring the droplets to a tubular furnace; (iv) passing the droplets through the furnace to form metal/ceramic composite particles by evaporation of water; and (v) collecting the particles in a collector.

In detail, the flow of the AACA process is as follows. Step (i) is to obtain a precursor solution by mixing metal and ceramic nanoparticles in water, in which the metal is preferably platinum (Pt) and the ceramic is preferably titanium dioxide ($TiO_2$). In more detail, Pt nanoparticles and $TiO_2$ nanoparticles synthesized by reacting $H_2PtCl_6$ and sodium citrate in distilled water are mixed in distilled water to obtain a colloidal solution as the precursor solution. This step may comprise agitating and sonicating the colloidal solution to obtain a homogenous dispersion. The weight ratio of platinum to titanium dioxide may be 0.02 to 0.2.

Step (ii) is to atomize the precursor solution into aerosol droplets using an ultrasonic atomizer, in which the ultrasonic atomizer may be used to produce aerosol droplets, which are typically a few microns to tens of microns in diameter. Each droplet may contain an aqueous dispersion of platinum and titanium dioxide nanoparticles.

Step (iii) is to transfer the droplets to a tubular furnace, in which the droplets may be transferred by a carrier gas.

Step (iv) is to pass the droplets through the furnace to form metal/ceramic composite particles by evaporation of water, in which the temperature of the furnace may be 300 to 700° C. While the water contained in the aerosol droplets is evaporated, the nanoparticles in the droplets may form porous spherical particles by co-assembly.

Finally, step (v) is to collect the particles in a collector, in which nanoporous metal/ceramic composite particles can be collected. According to a preferred embodiment of the present invention, it is possible to collect nanoporous $Pt/TiO_2$ composite particles.

Moreover, the present invention provides nanoporous $Pt/TiO_2$ composite particles prepared by the above preparation method. The composite particles have a micron size, and the average diameter of the particles may be 1 to 1.5 μm. In a preferred embodiment of the present invention, the metal used is platinum (Pt) and the ceramic used is titanium dioxide ($TiO_2$). Small Pt nanoparticles are found to be uniformly distributed on the surface of much larger $TiO_2$ nanoparticles.

Furthermore, the present invention provides a fuel cell comprising the nanoporous $Pt/TiO_2$ composite particles as a catalyst. In a preferred embodiment of the present invention, the metal used is platinum (Pt) and the ceramic used is titanium dioxide ($TiO_2$), which are found to have a catalytic effect similar to that of commercially available Pt/carbon black.

The term "fuel cell" used in the present invention refers to a device which does not require replacement or charging of the cell, unlike conventional ordinary batteries, and converts chemical energy of a fuel such as hydrogen, methanol or the like, into electrical energy by electrochemical reaction. The fuel cell has many advantages such as high efficiency (its energy conversion efficiency is about 60%), use of various fuels, etc. Moreover, due to its advantages such as small installation area, short construction period, etc., the fuel cell can be used in various applications such as portable power sources for cellular phones, alternative power sources for vehicles, distributed generation systems for domestic and industrial applications, etc. Especially, when the commercialization of fuel cell vehicles as next-generation vehicles is realized, it is expected that the size of the potential market for the fuel cell vehicles is huge. In particular, the fuel cell has attracted much attention as an energy source for vehicles which requires higher power than proton exchange membrane fuel cells (PEMFCs).

Hereinafter, the present invention will be described in detail with reference to Examples. The following Examples are merely illustrative of the present invention, and the scope of the present invention is not limited thereby.

Example 1

Experimental Methods

1. Synthesis of Porous $Pt/TiO_2$

Figure 2:
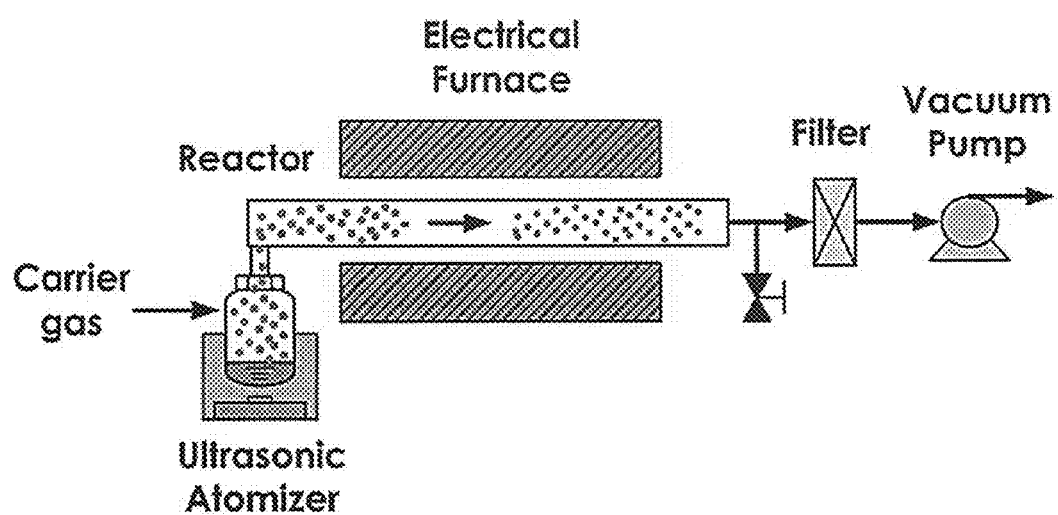
FIG. 2 schematically shows an experimental apparatus consisting of an ultrasonic atomizer, an electrical tubular furnace, and a particle collector.

A colloidal mixture of Pt and $TiO_2$ nanoparticles was prepared as an aerosol precursor solution. Pt nanoparticles of less than 5 nm in diameter were synthesized by reacting $H_2PtCl_6$ and sodium citrate at 100° C. in distilled water and purified by centrifugation. Then, $TiO_2$ nanoparticles of 20 nm in diameter were mixed with Pt nanoparticles in distilled water. The colloidal mixture of 40 ml in volume was agitated and sonicated for 30 minutes to obtain a homogenous dispersion. The weight ratio of $Pt/TiO_2$ varied from 0.02 to 0.2 while the weight of $TiO_2$ in the colloid was 0.4 g. A schematic illustration of the AACA experimental apparatus consisting of an ultrasonic atomizer, an electrical tubular furnace, and a particle collector is shown in FIG. 2. The ultrasonic atomizer was used to generate aerosol droplets, which are typically a few microns to tens of microns in diameter. Each droplet contained an aqueous dispersion of Pt and $TiO_2$ nanoparticles. Then, an air flow carried the aerosol droplets through the hot tubular furnace. While the water contained in the aerosol droplets was evaporated in the furnace at a high temperature, the aerosol particles were co-assembled and tightly aggregated to form the final porous spherical particles. The length and diameter of heating zone were 33.5 cm and 1.83 cm, respectively. The porous spherical particles were collected by a Teflon membrane filter under reduced pressure. The filter was heated to prevent water condensation on the filter. It took only several seconds to prepare the particles without the need for any post-synthetic heat treatment or purification steps.

2. Characterization

The particle morphology was characterized with a transmission electron microscope (TEM, Jeol 200) and a field-emission scanning electron microscopy (SEM; Sirion, FEI). Particle size was measured by a dynamic light scattering method using a particle size analyzer (PSA, Malvern, Mastersizer 2000). The BET specific surface areas were measured by $N_2$ adsorption desorption isotherms on a Quadrasorb Quantachrome analyzer. The pore size distributions were calculated from desorption isotherms using the BJH method (Barrett et al., 1951). Crystallinity of the as-prepared particles was synthesized by an X-ray diffractometer (XRD, Rigaku, RTP 300 RC) with CuKα target operated at 30 kV and 40 mA.

3. Electrochemical Instrument

Cyclic voltammetry (CV) of the methanol oxidation reaction was carried out in a three electrode system at room temperature using an Autolab electrochemical interface instrument (PGSTAT 302N). The Pt/TiO$_2$ composite was coated onto a glassy carbon electrode to prepare a working electrode. A platinum foil was used as the counter electrode and an Ag/AgCl electrode as the reference. The CV measurements were carried out in a solution of 0.05 M H$_2$SO$_4$+1 M CH$_3$OH in deionized (DI) water (~18Ω) within the potential range of 0 to 1.0 V (vs. SCE) with a scan rate of 0.05 mVs$^{-1}$. Prior to the CV measurements, the electrolyte was purged with nitrogen gas for 20 minutes to remove dissolved oxygen.

Example 2

Results of Experiments

1. Synthesis of Nanoporous Pt/TiO2 Spheres

Pt nanoparticles of less than 5 nm in diameter were prepared at 0.1 wt % of Pt precursor (H$_2$PtCl$_6$) in the distilled water by the liquid phase reduction. X-ray diffraction (XRD) pattern confirmed the formation of Pt (FIG. 5) and the crystallite size of Pt by applying the Scherrer formula to the peaks in the XRD pattern was 4.2 nm. The colloidal dispersion containing different weight ratios of Pt/TiO$_2$ was prepared by mixing and sprayed into the furnace.

Figure 3:
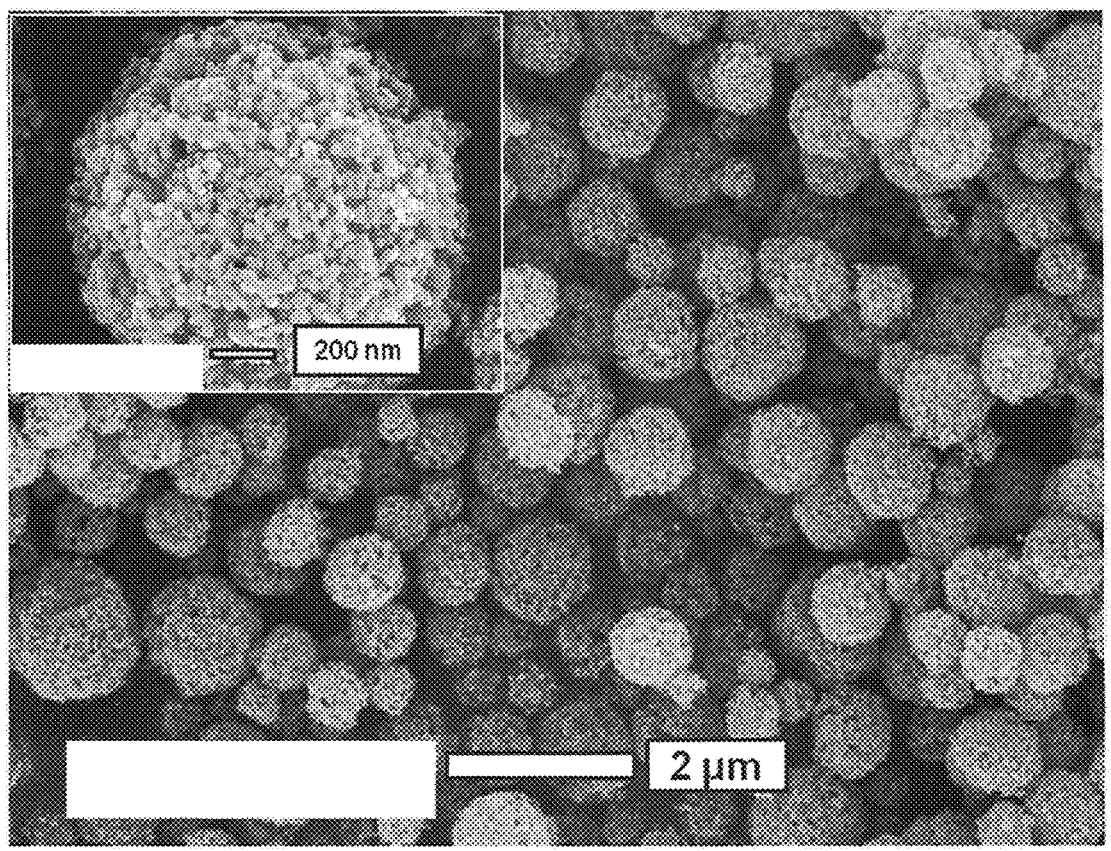
FIG. 3 shows field-emission scanning electron microscope (FE-SEM) images of nanoporous Pt/TiO$_2$ micro-particles prepared by an aerosol-assisted co-assembly (AACA) process at 300° C., in which the weight ratio of Pt/TiO$_2$ is 0.05, the concentration of TiO$_2$ in a colloidal solution is 1.0 wt %, and the carrier gas flow rate is 1 l/min.
Figure 4:
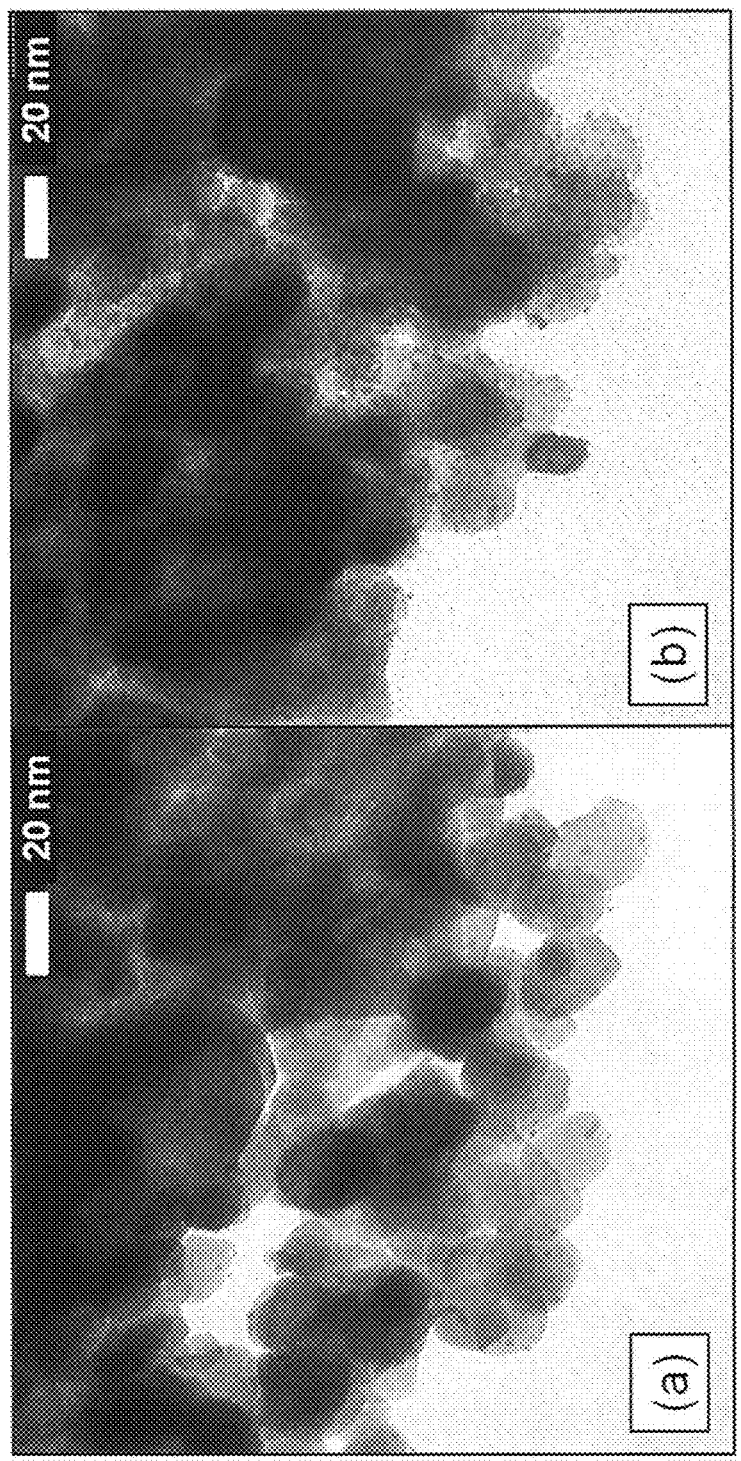
FIG. 4 shows transmission electron microscope (TEM) images of Pt nanoparticles deposited on the surface of TiO$_2$ nanoparticles at a different concentration of Pt, where Pt/TiO$_2$=0.05 by weight in (a) and Pt/TiO$_2$=0.20 by weight in (b)
Figure 5:
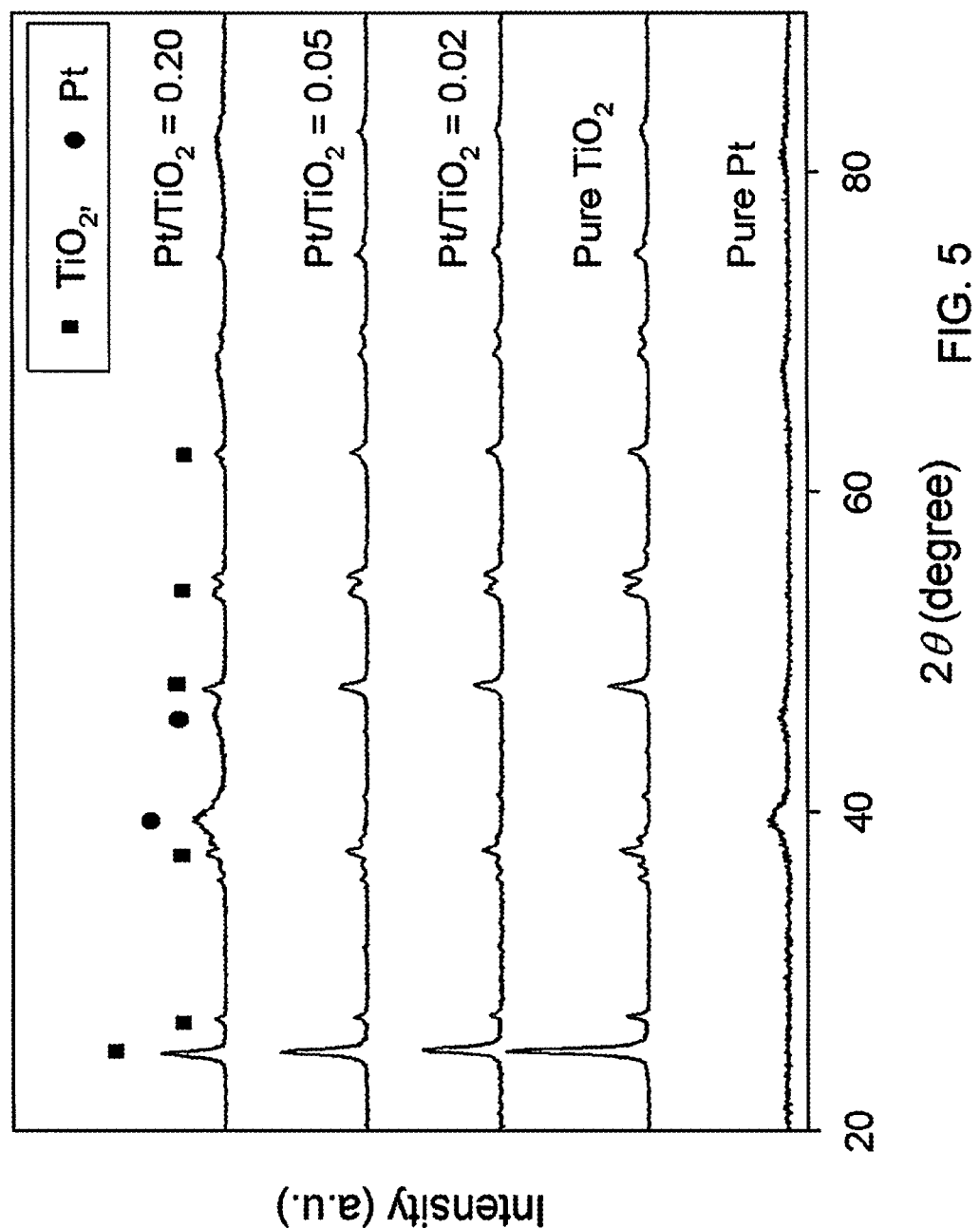
FIG. 5 shows X-ray diffraction (XRD) patterns of porous Pt/TO$_2$ particles at a different ratio of Pt/TiO$_2$.

FIG. 3 shows FE-SEM images of the resulting porous Pt/TiO$_2$ particles when the Pt/TiO$_2$ ratio was 0.05, while TiO$_2$ concentration in the colloid, furnace temperature, and carrier gas flow rate were 1.0 wt %, 300° C. and 1 l/min, respectively. The as-prepared Pt/TiO$_2$ particles were spherical in shape as expected from the evaporation driven self-assembly. The average diameter of the particles measured by the PSA was around 1.2 μm, which was consistent with the SEM observation. The average diameter of the particles was much affected by the Pt/TiO$_2$ ratio since the Pt nanoparticles were much smaller than the TiO$_2$ nanoparticles. The formation of porous spherical particles could be clearly observed in the FE-SEM images. TEM images (FIG. 4) of the samples revealed well dispersed Pt nanoparticles of less than 5 nm in diameter on the surface of every single TiO2 nanoparticles. The number of Pt nanoparticles adhering to the surface of TiO$_2$ particles increased with higher Pt content in the starting colloidal mixture. FIG. 5 shows the XRD patterns of TiO$_2$ (P25), as-synthesized Pt and composite particles with different Pt contents. As the Pt/TiO$_2$ ratio increased from 0.02 to 0.20, the intensity of TiO$_2$ peak decreased. Both Pt and TiO$_2$ peak of the composite particles were clearly distinguishable when the Pt/TiO$_2$ ratio was 0.20 in the colloidal mixture.

Figure 6:
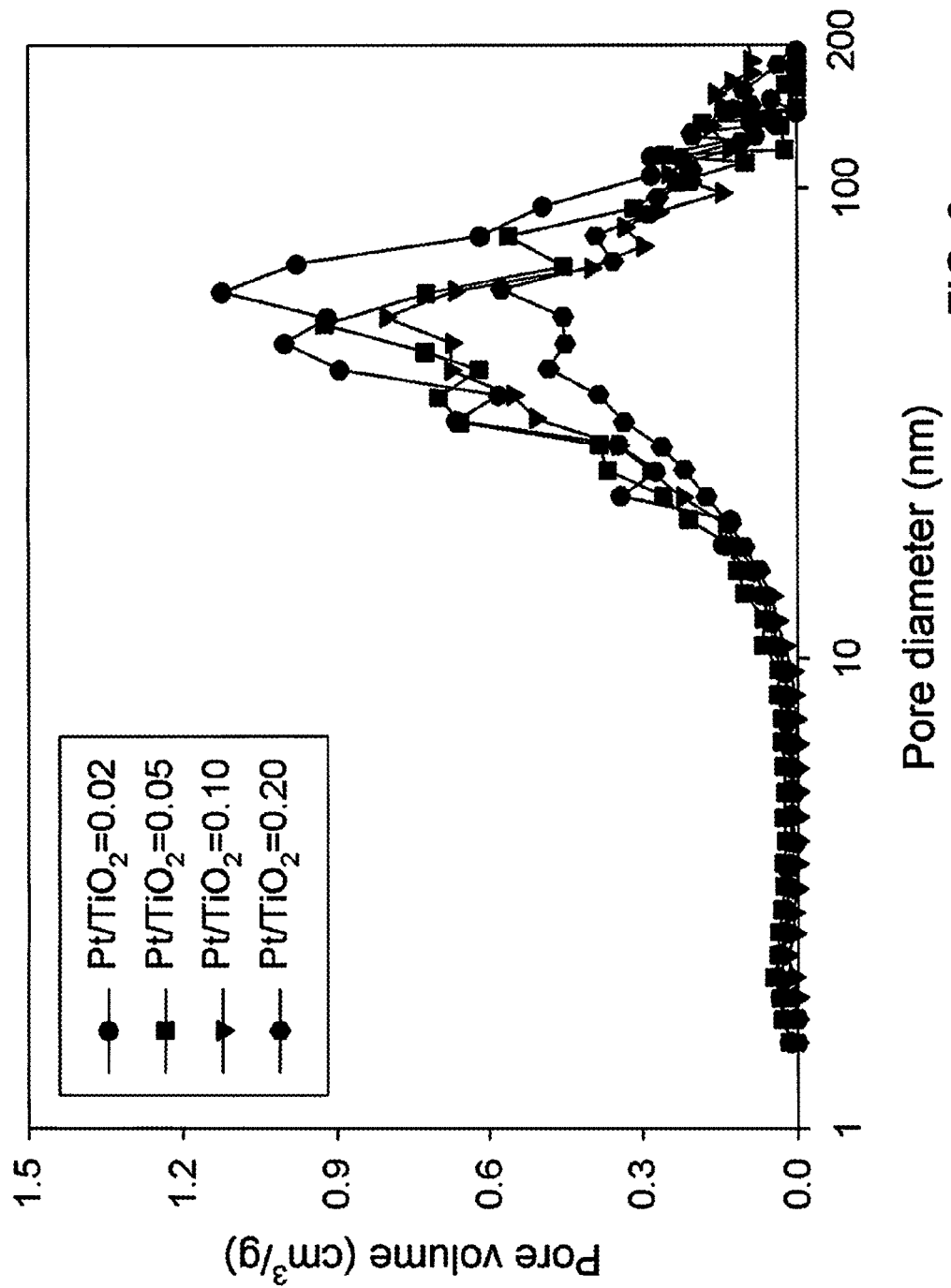
FIG. 6 shows the pore size distribution of porous Pt/TO$_2$ particles at different ratios of Pt/TiO$_2$.

FIG. 6 shows the pore size distributions of porous Pt/TO$_2$ particles. Mesopores (2-50 nm) and macropores (>50 nm) were measured in the range of 2 to 200 nm in diameter. As the Pt/TiO$_2$ ratio increased from 0.02 to 0.20, the total pore volume of the particles decreased from 0.53 to 0.36 cm$^3$/g, and the specific surface area of the composite increased from 55 to 67 m$^2$/g. Increased loading of Pt nanoparticles on the surface of TiO$_2$ may decrease the total volume of interstitial pores. The increase of specific surface area is attributed to the increased number of Pt nanoparticles on the surface of much larger TiO$_2$ particles.

Effect of furnace temperature on the specific surface area and pore size distribution was also investigated. The specific surface area decreased slightly from 59 to 53 m$^2$/g as the temperature increased from 300 to 700° C. (Pt/TiO$_2$ ratio: 0.05, TiO$_2$ concentration: 1.0 wt % and carrier gas flow rate: 1.0 l/min).

Figure 7:
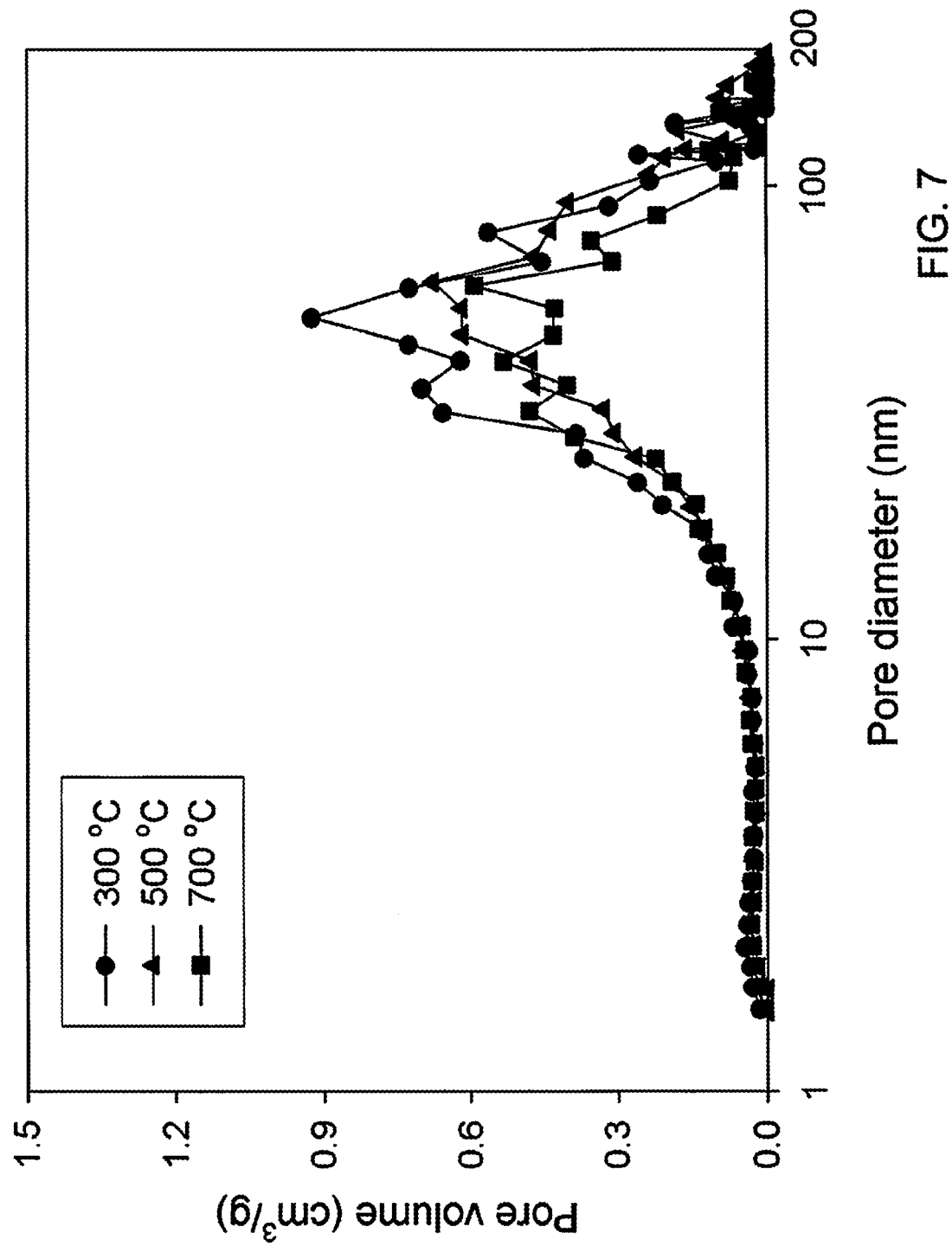
FIG. 7 shows the pore size distribution of porous Pt/TO$_2$ particles at different temperatures.
Figure 8:
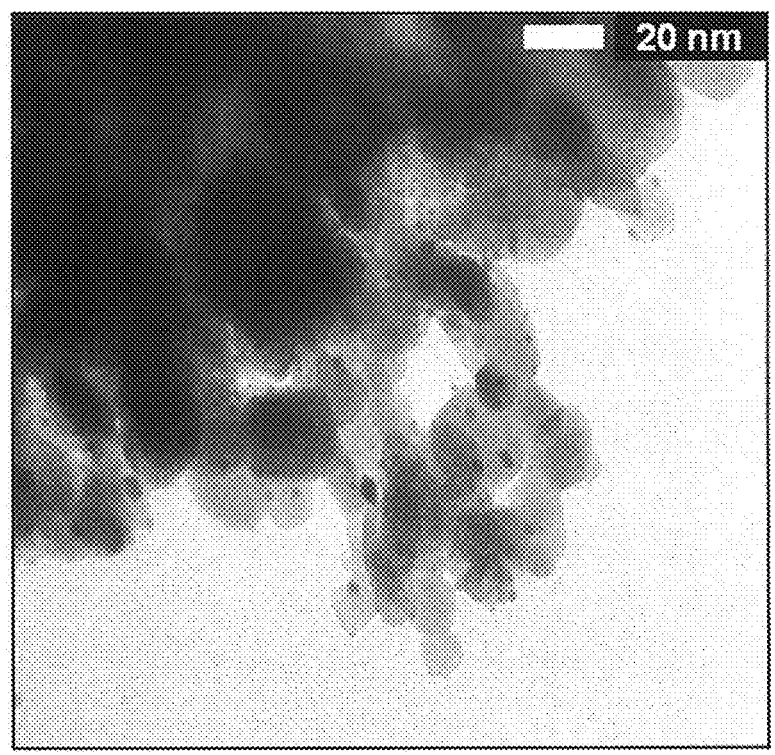
FIG. 8 is a TEM image of Pt nanoparticles present on the surface of TiO$_2$ nanoparticles at 700° C., in which the weight ratio of Pt/TiO$_2$ is 0.05 and the concentration of TiO$_2$ in a colloidal solution is 1.0 wt %.

A slight decrease of mesoscopic pore volume from 0.46 to 0.35 was observed due to tighter packing of nanoparticles at higher temperature (FIG. 7). Also, TEM observation showed that the size of Pt nanoparticles increased slightly due to sintering at 700° C. (FIG. 8). This is expected because the characteristic sintering time of Pt nanoparticles in nitrogen atmosphere at this temperature is 3.32×10$^{-4}$ s. Carrier gas flow rate is inversely proportional to residence time of nanoparticles in the heating zone of the furnace. Therefore, variation of flow rate can affect final particle properties such as the aggregation and sintering of the nanoparticles constituents. When the gas flow rate varied from 0.5 to 1.5 l/min, the residence time of particles decreased from 8.0 to 3.0 s. As a result, the specific surface area of the resulting particles increased from 54 to 63 cm$^3$/g. This suggests that the residence time can affect the degree of packing of the nanoparticles.

2. Evaluation of Electrocatalytic Activity

Figure 9:
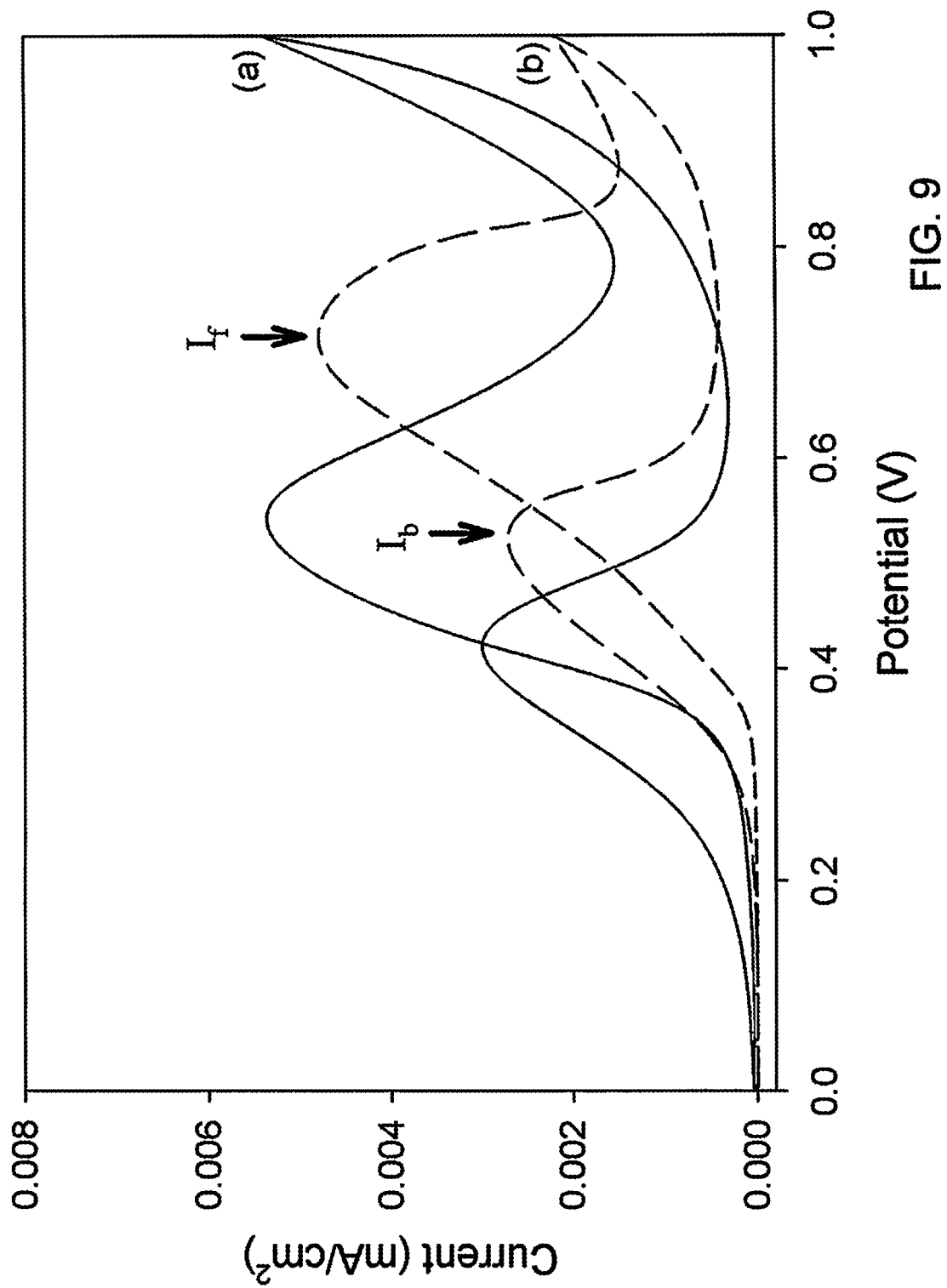
FIG. 9 shows current-potential curves of methanol oxidation reaction for Pt/carbon black and Pt/TiO$_2$.

Through the above example, it has been demonstrated that the AACA is an effective strategy to achieve co-assembly of different nanoparticles for preparing nanoporous composite particles. Next, the Pt/TiO$_2$ composite was tested as a fuel cell electrode catalyst for methanol oxidation reaction (MOR). The cyclic voltammetry measurements were carried out with the as-prepared Pt/TiO$_2$ composite which contained 20 wt % Pt. A commercial 20 wt % Pt/carbon black catalyst (Alfa Aesar) was chosen as a reference for comparison. TEM imaging of the commercial catalyst showed well dispersed Pt nanoparticles with the size of around 3 nm on the surface of carbon black nanoparticles of 20 nm in diameter. FIG. 9 shows the current-potential curves of MOR for Pt/carbon black and Pt/TiO2. The amount of metals was 1 mg for both catalysts per apparent electrode area.

The onset potential of MOR was around 0.32 and 0.35 V versus the reference platinum electrode for commercial Pt/carbon black and Pt/TiO$_2$, respectively. The current density of Pt/TiO$_2$ was slightly smaller than Pt/carbon black by about 0.2 mA. The reverse anodic peak for MOR is attributed to the removal of the incompletely oxidized carbonaceous species formed in the forward scan. Hence, the ratio of the forward peak current density ($I_f$) to the reverse anodic peak current density ($I_b$), $I_f/I_b$, indicates the tolerance of catalyst to carbonaceous species. A lower $I_f/I_b$ ratio indicates poor oxidation of methanol to carbon dioxide during the anodic scan and excessive accumulation of carbonaceous residues on the catalyst surface.

The $I_f/I_b$ ratio was estimated to be 1.54 and 1.52 for Pt/carbon black and Pt/TiO$_2$, respectively. Thus, the catalytic performance of Pt/TiO$_2$ was found to be comparable to that of commercial Pt/carbon black catalyst.

Nanoporous Pt/TiO$_2$ micro-particles were successfully prepared with the AACA process by the rapid evaporation of droplets in the colloidal dispersion of Pt and TiO$_2$. Small Pt nanoparticles were found to be uniformly distributed on the surface of much larger TiO$_2$ nanoparticles, rendering them active for catalyzing the oxidation of methanol in fuel cells with performance comparable to the commercial Pt/carbon black electrocatalysts.

As described above, the nanoporous Pt/TiO$_2$ composite particles according to the present invention have a catalytic effect similar to that of commercially available Pt/carbon black and, thus, can be applied to a fuel cell.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method for preparing nanoporous metal/ceramic composite particles for a fuel cell, the method comprising:
   (a) preparing an aqueous colloidal solution by mixing metal nanoparticles and ceramic nanoparticles in water;
   (b) atomizing the colloidal solution of step (a) into aerosol droplets by using an ultrasonic atomizer, wherein the aerosol droplets contain an aqueous dispersion of the metal nanoparticles and ceramic nanoparticles; and
   (c) evaporating the water within the aerosol droplets at a temperature of 300° C. to 700° C.,
   wherein the weight ratio of metal to ceramic is 0.02 to 0.2.

2. The method of claim 1, wherein said step of evaporating includes transferring the droplets to a tubular furnace and passing the droplets through the tubular furnace to form self-assembled metal/ceramic composite particles by evaporation of the water;
   the method further comprising the step of (d) collecting the particles in a collector.

3. The method of claim 1, wherein the metal is platinum (Pt).

4. The method of claim 1, wherein the ceramic is titanium dioxide ($TiO_2$).

* * * * *